United States Patent [19]

Summerell

[11] 4,406,481

[45] Sep. 27, 1983

[54] SEALING CLAMPS

[75] Inventor: Michael Summerell, Barry, Wales

[73] Assignee: SIBEX (Construction) Limited, Manchester, England

[21] Appl. No.: 206,679

[22] Filed: Nov. 13, 1980

[30] Foreign Application Priority Data

Nov. 15, 1979 [GB] United Kingdom ................. 7939518

[51] Int. Cl.³ ............................................. F16L 55/10
[52] U.S. Cl. ........................................ 285/15; 137/15; 138/99; 285/363
[58] Field of Search ..................... 285/15, 363; 138/99; 137/15

[56] References Cited

U.S. PATENT DOCUMENTS

| 866,395 | 9/1907 | Skinner et al. | 285/363 X |
|---|---|---|---|
| 1,876,415 | 9/1932 | Heard | 285/363 X |
| 2,547,321 | 4/1951 | Henderson | 285/363 X |
| 3,152,816 | 10/1964 | Smith | 285/15 |
| 3,550,638 | 12/1970 | Smith | 285/15 X |
| 3,603,616 | 9/1971 | Smith | 285/15 |
| 3,770,301 | 11/1973 | Adams | 285/15 |
| 4,171,142 | 10/1979 | Harrison | 285/15 X |
| 4,209,029 | 6/1980 | Pennington | 138/99 X |
| 4,274,640 | 6/1981 | Cook . | |

Primary Examiner—Thomas F. Callaghan
Attorney, Agent, or Firm—Cushman, Darby & Cushman

[57] ABSTRACT

A clamp is provided to seal the gap between a pair of flanges (8) of connected sections of pipe (7) when a gasket (10) between the pipe sections fails. The sealing clamp comprises a pair of half-rings (1) incorporation rectangular grooves (3) which receive a lead sealing insert (4) formed with a tapered face (6) opposite that which is received in the groove (3). The half-rings (1) have terminal lugs bored to receive bolts by means of which the clamp can be tightened about the flanges (8), with the result that the insert (4) is distorted to form an effective annular seal for the gap between the flanges (8). The tapered face (6) ensures that the clamp is self-centering and that the clamp is not likely to be displaced sideways if subjected to an accidental blow. Pre-drilled holes (13) in the half-rings (1) can be continued through the insert (4) to enable a sealing compound to be injected.

12 Claims, 8 Drawing Figures

SEALING CLAMPS

BACKGROUND OF THE INVENTION

This invention is concerned with a clamp for use in sealing the gap between a pair of confronting pipe flanges integral with the ends of two pipes which have been bolted together to form part of a pipe line. Such flanges are usually bolted together using an intervening gasket to prevent leakage. When the flanges are bolted together, the gasket, in the form of an annular seal, is clamped between the flanges, normally radially inwardly of the bolts. If the gasket develops a fault, because it has been subjected to the prolonged action of corrosive fluid, for example, then a leak may occur through it and release fluid between the flanges. If the fluid supply cannot conveniently be interrupted, then steps may have to be taken to stop the leak whilst the pipe still contains fluid and until a permanent repair can be effected.

One conventional procedure for closing such leaks is to hammer a malleable wire into the annular gap between the confronting outer edges of the flanges; these edges are then peened over to hold the wire in place. Holes are then drilled or tapped through at least one of the flanges into the space between the wire and the existing, but leaking gasket and a sealant material is then injected through these holes to fill the space and at the same time stop the leak. This procedure of caulking with wire followed by drilling holes and injecting a sealant material is a very specialised technique which requires significant skill and training if it is to be carried out safely and effectively. In particular, great care has to be taken when drilling the holes if the pipe is carrying a potentially explosive fluid. Typically the invention is concerned with leaks in the flanged joints of high pressure lines for industrial processes involving, for example, water, steam, acid, various gases, hydrocarbons, compressed air or oil. The kind of hazard which may be involved is self-evident.

DESCRIPTION OF THE INVENTION

This invention provides a clamp comprising a ring to be positioned about a pair of confronting pipe flanges, means for tightening the ring against the flanges, the ring having a circumferential, inwardly facing groove in an inner surface thereof, together with an insert for said groove formed from a pressure deformable material and an outwardly-directed face which is received in the groove in the ring and an inwardly-directed face with a substantially symmetrical taper adapted, when the ring is tightened in use, to sealingly engage the opposed margins of an annular gap defined between said confronting flanges.

This clamp replaces the wire caulking which is utilised in the method discussed earlier and the application of the clamp is a relatively simple procedure which can be carried out by an unskilled mechanic. A closed annular space is created between the insert and an existing gasket in place between the flanges, sealing material can thereafter be injected into this space. The tapered face of the insert locates the insert fairly precisely, so that the clamp is substantially symmetrically self-aligned with respect to the gap between the flanges; the circumferential groove formed in the ring holds the insert securely in place.

The insert is preferably formed from lead but may comprise some other pressure deformable malleable metal, natural or synthetic rubber, or a malleable plastics material. In preferred form the inwardly directed groove formed in the ring is of U-shaped cross-section; it is preferably straightsided (i.e. square or rectangular in section). It is possible however to form the groove in the ring as an arc of a circle in cross-section. In this latter case, the abutting portion of the insert can also be of circular, or part circular cross-section. In fact, the outwardly directed face of the insert may be of curved form, whatever shape of groove in the ring is employed. However it is generally preferred that the inwardly-directed face of the insert should be of pointed (tapered) configuration so as to guide the insert positively towards and into engagement with the margins defining the gap between the flanges. This combination of a recess in the ring with a malleable, shaped insert is important, because it ensures that in use, there is very little or no risk at all of the clamp being displaced sideways by an accidental blow. Positive location is achieved without regard to flange thickness axially of the pipe, so that the clamp is of universal application, for a given flange diameter.

The ring itself may be in the form of two semicircular parts with integral lugs provided with aligned holes through which securing bolts can be applied to tighten the ring against the flanges. Alternatively, the ring could be in the form of two semicircular parts hinged together at one end and carrying integral lugs at their other end, through which pass aligned holes to receive a bolt for tightening the ring against the flanges. A particularly advantageous feature of the clamp is that one or more holes can be drilled in the ring beforehand so as to pass through the ring radially inwardly along or close to the centre line of the recess or groove. Then when the ring and insert are secured about the flanges the only drilling required is to continue the existing drill holes through the deformable material forming the insert. For most insert materials there will be no great resistance to this operation, thereby obviating or at least greatly reducing the risk of undesirable heating and/or the possibility of sparks due to metal-to-metal contact. This is extremely important where the leaking fluid is inflammable or explosive. The pre-drilled holes constitute sealant injection ports and replace the holes which would otherwise have to be drilled in the flanges themselves.

The invention also extends to a method of sealing a leak from between a pair of confronting pipe flanges, wherein a clamp of the kind previously recited is applied about the flanges so that the inwardly directed face of the insert engages the margins of an annular gap defined between the flanges and the ring is then tightened, whereby the insert is deformed into sealing engagement with said margins.

Preferably the method of the invention includes the further step of filling the annular space created between the insert and an existing gasket installed radially inwardly of the edges of the flanges with a sealant material, after the ring has been tightened into position about the flanges. When a clamp which has drilled holes already formed in the ring is employed then the method will also include drilling a hole through the material of the insert as a continuation of each of the drill holes provided in the ring after the ring has been tightened into position, followed by injecting a sealant material into the space between the flanges through the or each hole so formed. This will normally be followed by plugging the or each hole to prevent extrusion of the sealant material.

DETAILED DESCRIPTION OF THE DRAWINGS

Preferred embodiments of the invention will now be described by way of example with reference to the accompanying drawings, in which.

Figure 1:
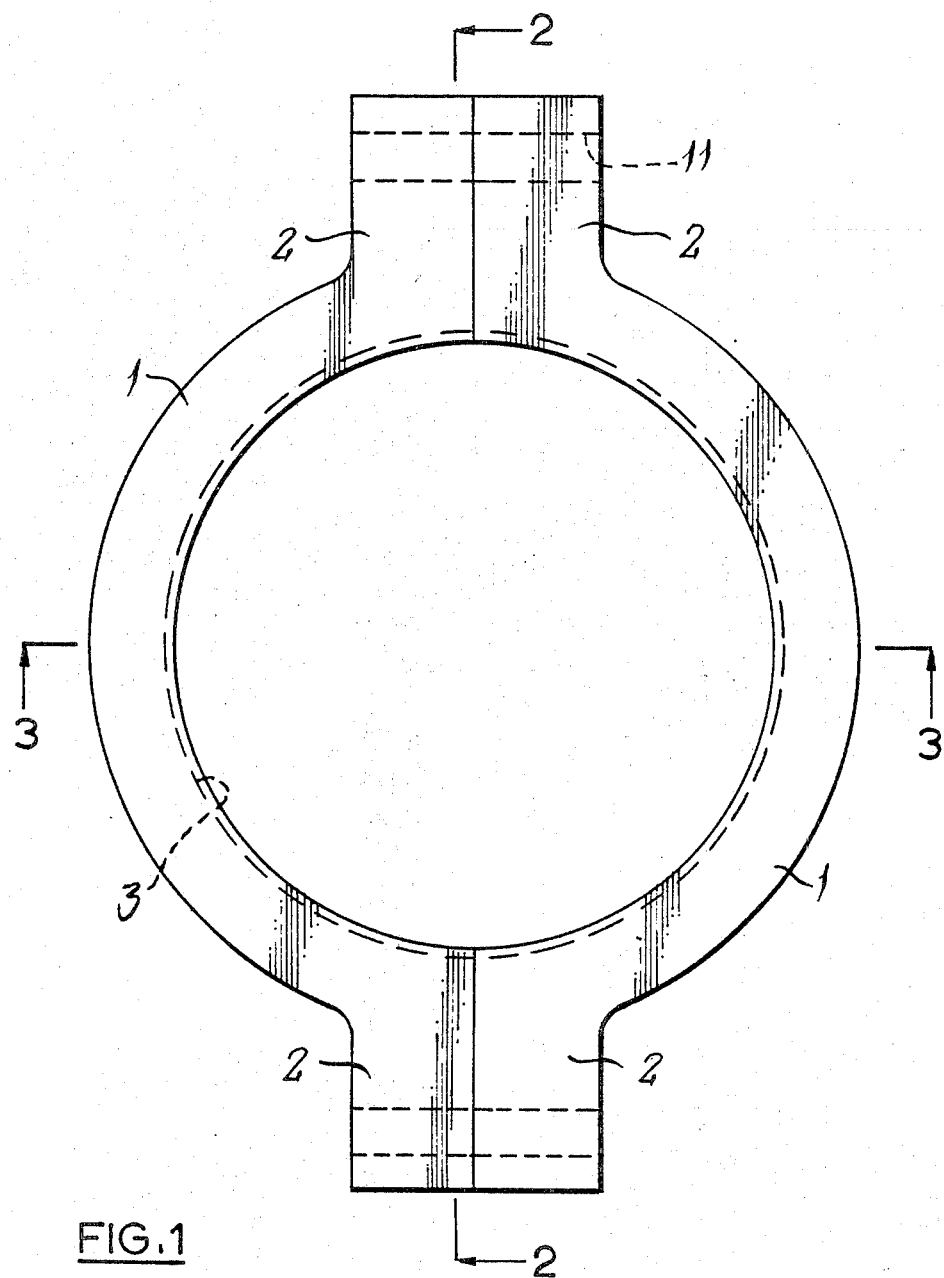
FIG. 1 is an end view of a ring forming part of a clamp according to the invention.
Figure 2:
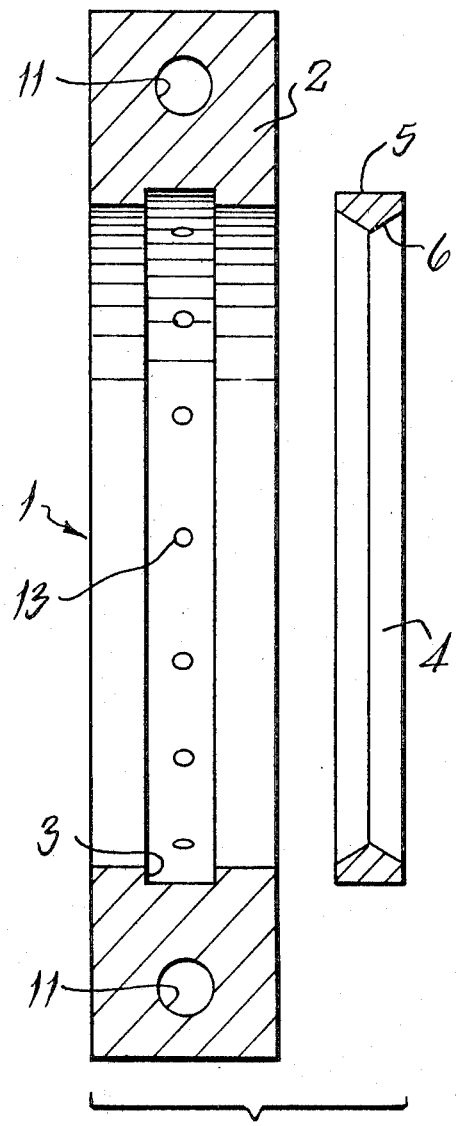
FIG. 2 is a cross-section on line 2—2 of FIG. 1 and also through an insert to be used with the ring of FIG. 1.
Figure 3:
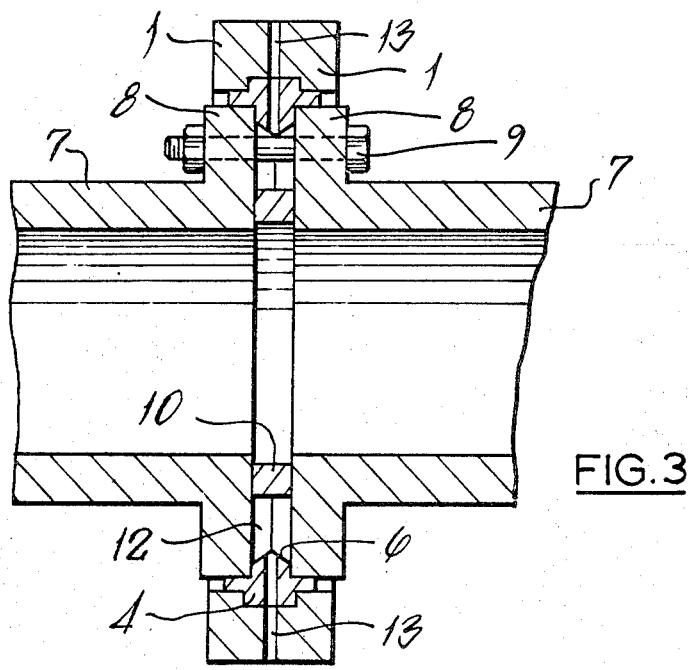
FIG. 3 is a section on line 3—3 of FIG. 1 through the complete clamp when positioned about a pair of confronting flanges at the ends of two pipe sections.

The clamp illustrated in FIGS. 1 and 2 comprises a pair of semicircular half-rings 1 with integral lugs 2, each half ring being formed with an annular, rectangular cross-section groove 3 on its inner surface. The groove receives an insert 4 (FIG. 2) formed from lead. As is seen in FIG. 2, the cross-sectional profile of the insert provides a radially outermost face 5 which fits into the groove 3 of the ring and an inwardly-directed face 6, which is of tapered section so as to locate the insert accurately within a gap defined between a pair of confronting flanges. Part of a pipe line comprising two pipe sections terminating in confronting circular flanges 8 is illustrated in FIG. 3 and the in-use location of the clamp of FIGS. 1 and 2 is shown in this Figure. The confronting pipe flanges 8 on the ends of the sections 7 are held together by bolts 9 passing through and between the flanges 8 so as to clamp them against a gasket 10. Assuming that the gasket 10 breaks down so that a pressurised fluid carried by the pipe 7 can escape past it and into the gap between the flanges 8, it may well be necessary to find some way of stopping the leak until a permanent repair can be made. Sometimes it is not feasible to immediately remove the gasket and replace it, because in order to do that, the pipe line must be drained and the flange joint dismantled. The desired, basic leak-stopping function is provided by the clamp provided by the parts 1 and 4. The two halves of the ring are positioned about the flanges 8 so that the tapered face 6 of the insert 4 engages the margins defining the gap between the flanges 8, and thereby centralises the whole clamp about the centre line of this gap. The two halves of the ring 1 are tightened together by bolts (not shown) passing through holes 11 (in FIGS. 1 and 2) in the lugs 2 of the ring halves. This results in distortion of the sealing insert into the gap between the flanges 8 and at the same time also sideways against the flanges 8 and the adjacent parts of the ring 1. This defines a closed annular space 12 between the insert 4 and the existing leaking gasket 10. Pre-drilled holes 13 are provided in the ring; these are shown in FIGS. 1 and 3. These holes are extended by drilling through the lead insert 4 to communicate with the space 12, as shown in FIG. 3 and a sealing material can then be injected into the space 12 through the holes 13 to complete an auxiliary seal. Injection can be accomplished with the aid of the grease gun type tool commonly used in this art. The holes 13 may be screw-threaded to permit plugging after injection, or they may be fitted with one way valves, e.g. grease nipples.

Subsequent heating of the assembly as well as the operating conditions of the pipe line are obviously restricted by the properties of the lead as well as by the choice of sealant material, since in the pure state the melting point of lead is 327° C. It is believed that working temperatures to 250° C. may be acceptable. From simple tests on samples of a lead insert, in the deformed and undeformed states, it is estimated that pressures in excess of 5000 lbf/in$^2$ would be necessary to cause collapse of of the lead insert in the flange gap. This magnitude of pressure is greatly in excess of that normally used for sealant injection, since there is a tendency for small amounts of sealant to escape near/along flange bolt holes and at the interface between the lugs 2, thereby causing some pressure relief.

Figure 5:
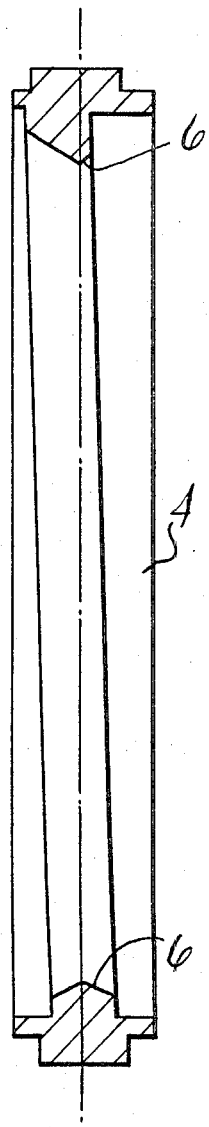
FIG. 5 is a cross-section through a sealing insert after deformation.
Figure 4:
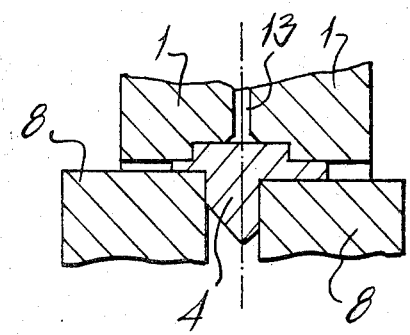
FIG. 4 illustrates, in cross-sections, a modified form of distortion of the sealing insert.

Whilst the intention is that the tapered portion 6 of the insert will provide accurate self-alignment of the clamp centrally of the centre line of the gap between the flanges 8, a certain amount of misalignment can be tolerated. This could occur if the two flanges 8 are somewhat eccentrically aligned, so that there is a slight overlap as illustrated in FIG. 4. However, even though the centre line of the clamp is not aligned with the centre line between the two clamps 8, in the configuration as shown in FIG. 4, this is not absolutely critical since the extension of the drill hole 13 through the lead insert 4 will still communicate with the space 12. If the drill should contact one flange 8 it will tend to be deflected down the side of the flange until the drill has passed completely through the insert 4. Another possibility is that, as the two halves of the ring are tightened about the flanges a degree of misalignment of the insert around at least part of the circumference of the clamp may occur as illustrated in FIG. 5. For a flange cap which is say 0.6 mm wide the sealing clamp may be offset by a maximum of 0.3 mm.

Figure 6:
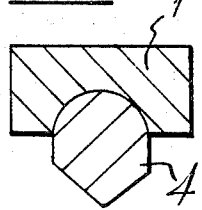
FIGS. 6 to 8 are cross-sections through portions of modified forms of clamps of this invention.
Figure 7:
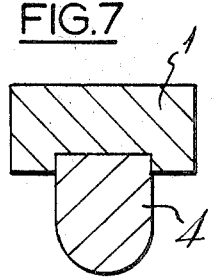
Figure 8:
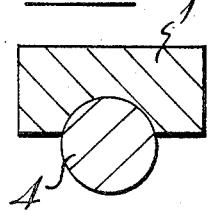

Alternative configurations for the ring and the insert are illustrated in FIGS. 6 and 8. In each of these arrangements there is still a groove in the ring which locates the insert and ensures that it does not slip sideways with respect to the sealing ring. Thus a curved groove, as shown in FIGS. 6 and 8, is adequate for this purpose although the rectangular groove as shown in FIGS. 2 and 7 is preferred. Furthermore satisfactory centralisation of the insert in the gap between the flanges 8 will be achieved if the inwardly directed face of the insert is of a curved shape, as illustrated in FIGS. 7 and 8, although again, for most purposes a pointed (tapered) face as illustrated in FIGS. 2 and 6 is preferred as being more convenient to use on a real leak, where visibility may be minimal due to the leaking fluid.

Whilst the insert 4 is described as being formed from lead it may be constructed from some other malleable or deformable material. Copper or brass is a possibility but this might prove to be insufficiently malleable to create the deformation required and it is more difficult to drill (and of course to mould into the initial shape) than lead. Malleable plastics materials are also feasible but must be carefully chosen so that they are inert to any chemicals which may be present in or leaking from the pipe line. The temperature of the contents of the latter needs to be considered in this context. With regard to the sealant material used in any circumstances, many such compounds are commercially-available based on room temperature vulcanising (RTV) or thermally vulcanisable rubbers, thermosettable plastics and the like, with or without reinforcing fillers, such as fibres. Compounds are available for most of the commonly encountered leaking fluids. The choice of compound is a matter for the technician dealing with the leak, of course.

I claim:

1. A clamp assembly adapted to seal leaks from the gap between a pair of mis-aligned flanges, said assembly comprising:

a ring adapted to be positioned about a pair of confronting pipe flanges, the ring having an inner diameter larger than the outer surface of the flanges;

means for tightening the ring about the flanges;

a circumferential, inwardly facing groove in an inner surface of said ring, together with:

an insert for said groove formed from a pressure deformable material, the insert having a outwardly-directed face which is received in the groove in the ring and an inwardly-directed face with a substantially symmetrical taper to self-center the insert in the annular gap between the flanges;

the ring having at least one preformed drill hole passing therethrough radially inwardly along or closely adjacent the center line of said groove whereby, when the ring is tightened in use, the insert centers itself and then extrudes outwardly from the ring and contacts the outer diameter of the confronting pipe flanges and the gap between the confronting flanges, thereby sealingly engaging the opposed margins of an annular gap defined between said confronting flanges.

2. The clamp of claim 1, wherein the material of the insert is selected from the group consisting of lead, malleable metal, natural rubber, synthetic rubber, and a malleable plastics material.

3. The clamp of claim 1 or 2, wherein the groove formed in the ring is of U-shaped cross-section.

4. The clamp of claim 3, wherein the groove is straight-sided.

5. The clamp of claim 1 or 2, wherein the groove in the ring forms an arc of a circle in cross-section.

6. The clamp of claim 5, wherein the insert is of a circular cross-section.

7. The clamp of claim 1 or 2, wherein the inwardly-directed face of the insert is of curved, pointed or tapered configuration.

8. The clamp of claim 1, 2, 3 or 5, wherein the ring is in the form of two semi-circular portions terminating in integral lugs provided with aligned holes through which securing bolts are in use applied to tighten the ring about a pair of confronting pipe flanges.

9. The clamp of claim 1 2, 3 or 5, wherein the ring is in the form of two semi-circular parts which are hinged together at one end with integral lugs at their other ends, each lug having a hole therein through which a securing bolt is in use applied for tightening the ring about a pair of confronting pipe flanges.

10. A method of sealing a leak from between a pair of confronting pipe flanges using a clamp assembly comprising a ring adapted to be positioned about a pair of confronting pipe flanges, the ring having an inner diamater larger than the outer surface of the flanges; means for tightening the ring about the flanges; a circumferential, inwardly facing groove in an inner surface of said ring, together with an insert for said groove formed from a pressure-deformable material, the insert having a outwardly-directed face which is received in the groove in the ring and an inwardly-directed face with a substantially symmetrical taper to self-center the insert in the annular gap between the flanges, the ring having at least one preformed drill hole passing therethrough radially inwardly along or closely adjacent the center line of said groove, said method comprising the successive steps of:

(1) applying said clamp about the confronting pipe flanges and positioning the clamp so that the inwardly-directed face of the insert centers itself and engages the margins of an annular gap defined between the flanges, (2) tightening the ring about the flanges so that the insert is deformed extruding outwardly from the ring and contacting the outer diameter of the confronting pipe flanges, thereby sealingly engaging the opposed margins of the annular gap defined between the confronting pipe flanges, (3) drilling at least one hole through the material of the insert as a continuation of the preformed hole in the ring, and (4) injecting a sealant material into the space between the flanges through each hole so formed.

11. The sealing method of claim 10, wherein a space defined between the insert and an existing gasket installed radially inwardly of the outer edges of the flanged is filled with a sealant material after the ring has been tightened about the confronting flanges.

12. A sealing method according to claim 10, including the further step of plugging the drill holes after injection of the sealant material.

* * * * *